United States Patent
Hovakimyan et al.

(10) Patent No.: US 8,416,673 B1
(45) Date of Patent: Apr. 9, 2013

(54) CANCELING FAR END CROSS-TALK IN COMMUNICATION SYSTEMS

(75) Inventors: Karen Hovakimyan, Sunnyvale, CA (US); Gaurav Malhotra, Cupertino, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 1026 days.

(21) Appl. No.: 12/406,023

(22) Filed: Mar. 17, 2009

(51) Int. Cl.
*H04J 1/12* (2006.01)
*H04J 3/10* (2006.01)

(52) U.S. Cl. .................................................. 370/201

(58) Field of Classification Search .................. 370/201
See application file for complete search history.

(56) References Cited

U.S. PATENT DOCUMENTS

| | | | |
|---|---|---|---|
| 7,948,862 B2 * | 5/2011 | Parnaby | 370/201 |
| 2005/0186933 A1 * | 8/2005 | Trans | 455/296 |
| 2005/0289204 A1 * | 12/2005 | Tellado et al. | 708/300 |

\* cited by examiner

*Primary Examiner* — Alexander Jamal
(74) *Attorney, Agent, or Firm* — Sterne, Kessler, Goldstein & Fox P.L.L.C.

(57) ABSTRACT

A method and system are described for canceling far end cross-talk in communication systems. A first transmitter transmits the first effective data source signals across the first channel. A second transmitter transmits the second effective data source signals across the second channel. In one embodiment, a receiver unit receives first and second effective data source signals across a first channel and a second channel, respectively, and also one or more cross-talk signals. A far end cross talk (FEXT) canceller located in the receiver unit receives second estimated effective data source signals based on the second effective data source signals. The receiver unit cancels the one or more cross-talk signals using the second estimated effective data source signals.

18 Claims, 8 Drawing Sheets

CANCELING FAR END CROSS-TALK IN COMMUNICATION SYSTEMS

TECHNICAL FIELD

Embodiments of the invention relate to the field of canceling far end cross-talk in communication systems; more specifically, embodiments of the invention relate to canceling far end cross-talk in communication systems having Tomlison-Harashima Precoding (THP) on the transmitter side.

BACKGROUND

Digital signal processing is widely used to process data carrying signals to remove, for example, inter-symbol interference (ISI), echoes, cross talk and other impairments, and to provide filtering, correlation and other processing. In structured cabling, crosstalk can refer to electromagnetic interference from one unshielded twisted pair to another twisted pair, normally running in parallel. Far End Crosstalk (FEXT) is interference between two pairs in one cable measured at the other end of the cable as the transmitter.

In communication systems with multilane transmission through copper cables (e.g., twisted pairs) or dielectric medium (e.g., microstrip traces) far end cross-talk (FEXT) can significantly degrade performance of these communication systems.

SUMMARY OF THE INVENTION

A method and system are described for canceling far end cross-talk. In one embodiment, a receiver unit receives first and second effective data source signals across a first channel and a second channel, respectively, and also one or more cross-talk signals. A far end cross talk (FEXT) canceller located in the receiver unit receives second estimated effective data source signals based on the second effective data source signals. The receiver unit cancels the one or more cross-talk signals using the second estimated effective data source signals. A first transmitter transmits the first effective data source signals across the first channel. A second transmitter transmits the second effective data source signals across the second channel.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and system are described for canceling far end cross-talk. In one embodiment, a receiver unit receives first and second effective data source signals across a first channel and a second channel, respectively, and also one or more cross-talk signals. A far end cross talk (FEXT) canceller located in the receiver unit receives second estimated effective data source signals based on the second effective data source signals. The receiver unit cancels the one or more cross-talk signals using the second estimated effective data source signals. A first transmitter transmits the first effective data source signals across the first channel. A second transmitter transmits the second effective data source signals across the first channel. The one or more cross-talk signals may be coupled onto the first channel based on the transmission of signals on the second channel or vice versa.

In the following description, numerous specific details are set forth, such as specific frequencies, in order to provide a thorough understanding of the present invention. It will be apparent to one skilled in the art, that the present invention may be practiced without these specific details. In other instances, well-known circuit elements, such as summers and multiplexers, are not described in detail in order to not unnecessarily obscure the present embodiments.

Figure 1:
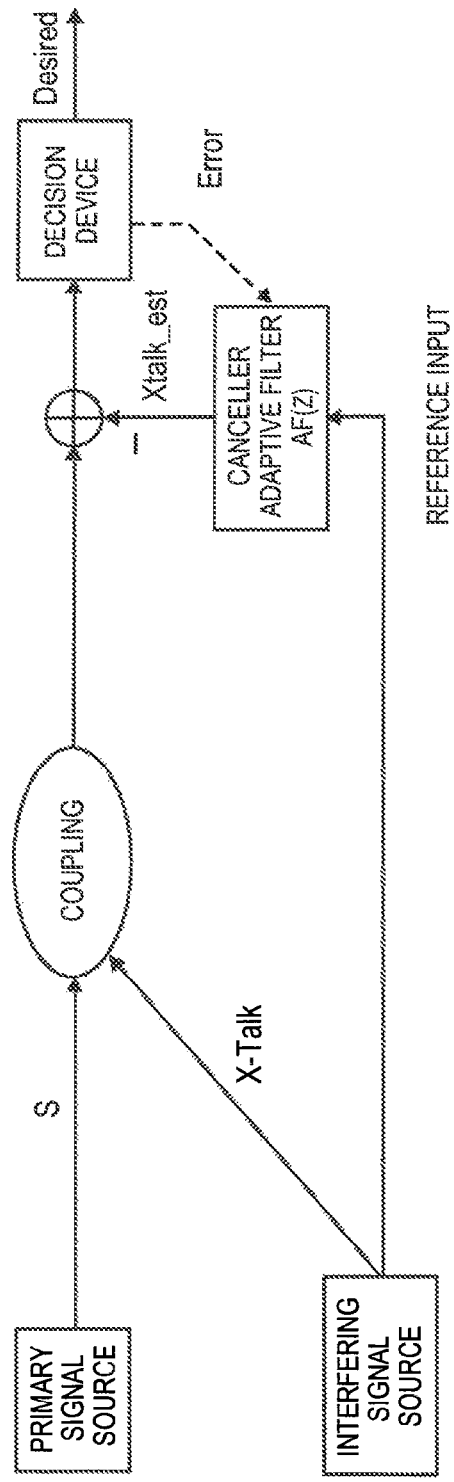
FIG. 1 illustrates a conventional communication system having cross-talk canceling.

FIG. 1 illustrates a communication system model showing far end cross-talk and a far end cross-talk canceller. This approach uses adaptive filter ('AF') to generate the estimated cross-talk signal ('Xtalk_est') in order to eliminate it from the primary signal 'S' as illustrated in FIG. 1. Note that the canceller with the AF has two inputs, reference data and error. Based on error and reference data an adaptive algorithm such as least mean square (LMS) will update canceller taps to match the cross-talk due to the interfering signal source that is from another channel. Assuming that the AF coefficients can mimic the cross-talk channel, an accurate cross-talk cancellation requires an accurate estimation of the AF input data (referred to herein as 'reference input'). Reference input in the case of FEXT may not be known in the receiver (since FEXT data source resides in the far end transmitter) and hence data estimation may be required. An accurate cross-talk cancellation requires identification of the cross-talk channel, its input data, and error signal to be used for canceller adaptation.

Figure 2:
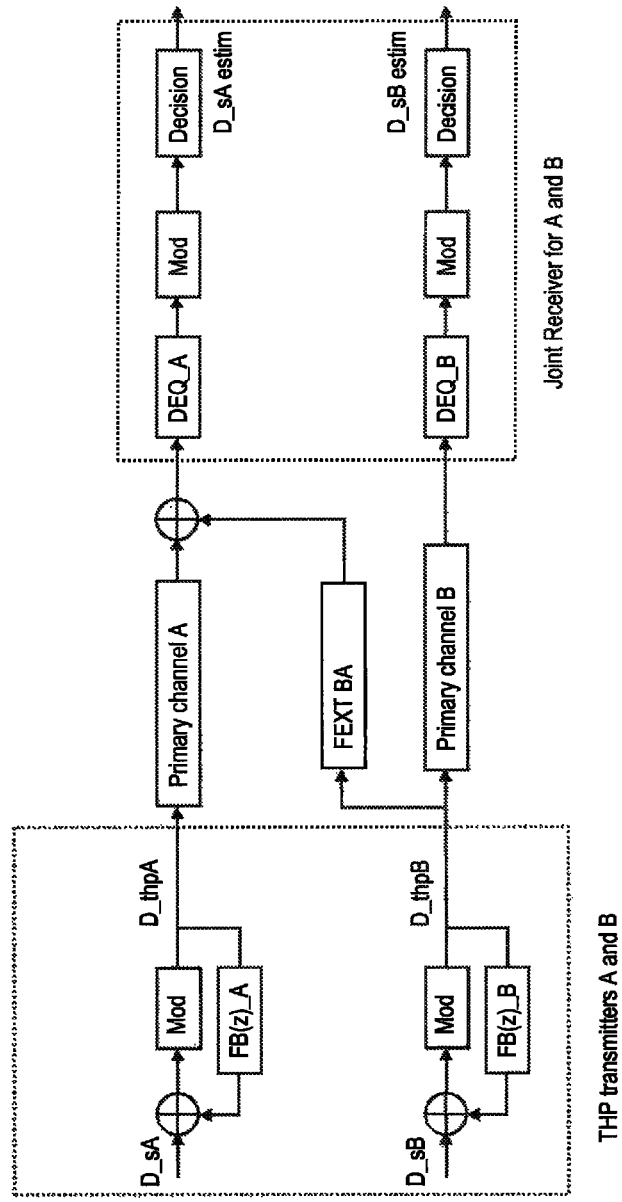
FIG. 2 illustrates a conventional communication system with a THP transmitter and a digital equalizer in the receiver with no FEXT compensation in the receiver.
Figure 3:
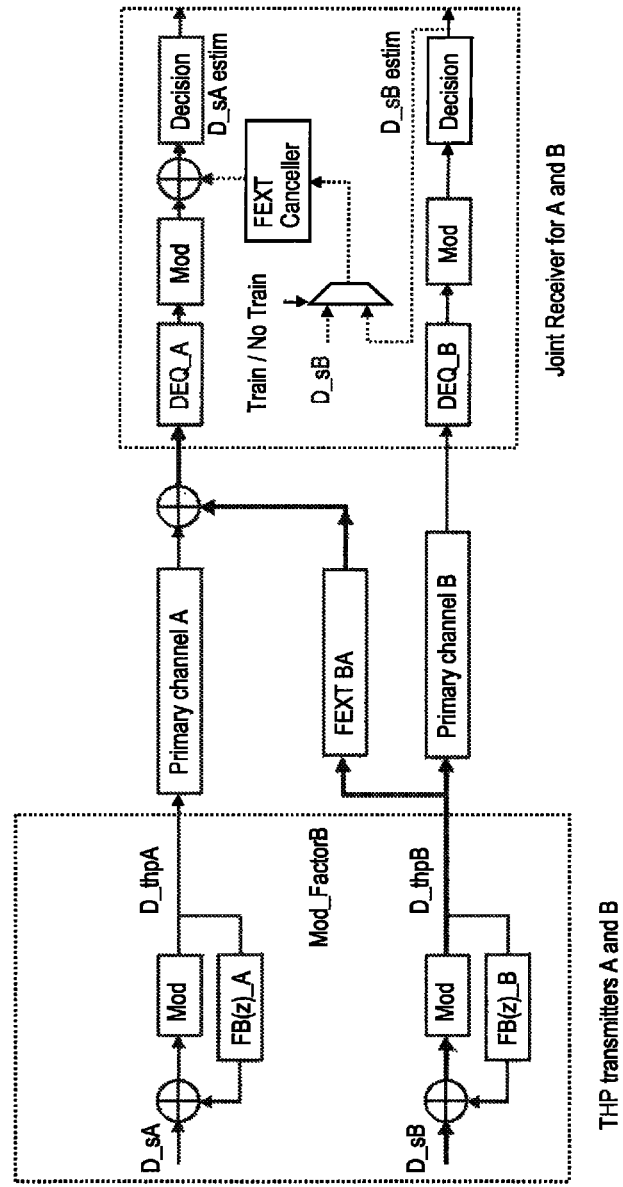
FIG. 3 illustrates a conventional communication system with FEXT compensation based on source data.

FIG. 2 illustrates a THP communication system model showing far end cross-talk. This communication system with non-linear processing such as Tomlinson-Harashima Precoding (THP) in the transmitter and a digital equalizer in the receiver is illustrated in FIG. 2. For simplicity only two communication channels A and B are shown along with FEXT interference from channel B to channel A represented by a channel named FEXT_BA. In order to cancel FEXT one needs to identify the FEXT channel, its input and error to be used for canceller adaptation. FIG. 2 suggests two approaches for FEXT channel identification. In FIG. 3 for the first approach, the FEXT_BA channel is a channel between source data, D_sB, and output of modulo device ('Mod') in the receiver A. The first approach considers source data, D_sB, to be the FEXT canceller reference input. For a THP communication system, this approach has poor performance since it includes non-linearity (block named 'Mod') inside the FEXT channel to be mimicked by the FEXT canceller. Another disadvantage of this approach is in the estimation of the reference input data ('D_sB_estim') which may be very inaccurate for uncoded pulse amplitude modulation (PAM) with M signals if modulo operation of Mod is involved. More precisely, PAM level M−1 will be decoded into negative (M−1) and vice versa in the case of erroneous detection.

Figure 4:
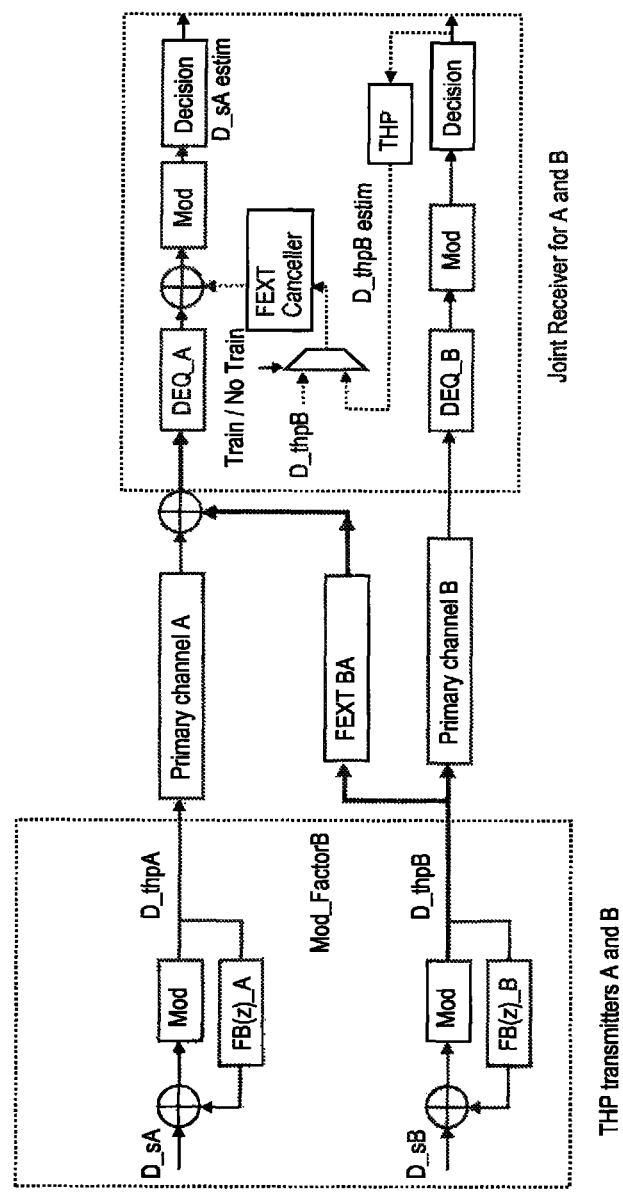
FIG. 4 illustrates a conventional communication system with FEXT compensation based on THP output data.

In FIG. 4, for the second approach, a FEXT channel is a channel between THP output, D_thpB, and input to the modulo device in the receiver A. The second approach limits the FEXT_BA channel to being a linear channel since it doesn't include modulo operation of Mod. However it still has a disadvantage: it requires estimation of reference input (D_thpB) to the FEXT_BA channel, which means that feedback process of generating THP data need to be repeated in the receiver. Since received data may contain errors this recursive feedback process will cause error propagation.

Figures 5, 6:
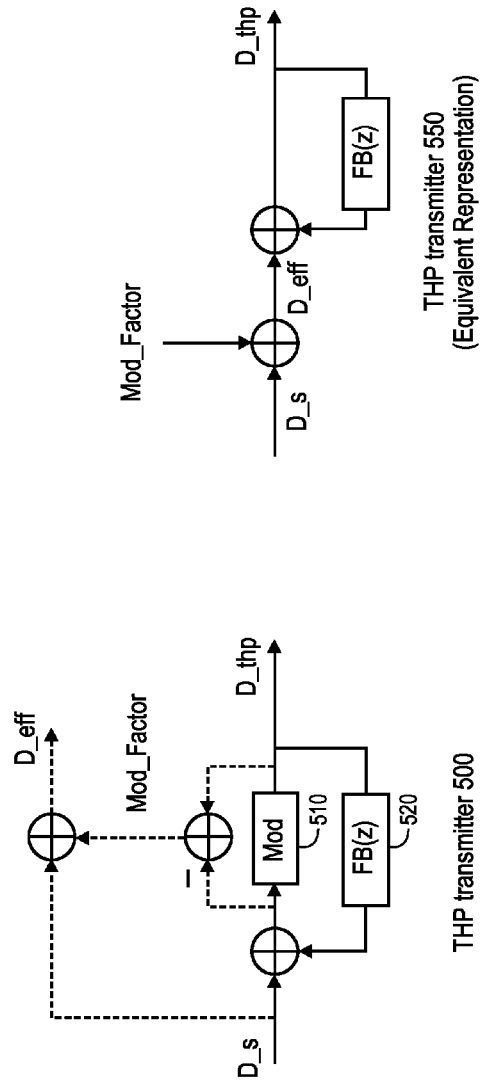
FIGS. 5 and 6 show an equivalent representation of THP operation using effective data in accordance with one embodiment.

FIGS. 5 and 6 show an equivalent representation of THP operation using effective data in accordance with one embodiment. The THP transmitter 500 includes a non-linear modulo unit 510 and feedback unit 520. The modulo unit 510 generates a D_thp output signal that includes non-linear components. The THP transmitter 550 is an equivalent representation of the THP transmitter 500 with the effect of the modulo unit 510 having been added to the input data, D_s, as Mod_Factor to generate an effective data source signal, D_eff. A linear channel associated with D_eff data, that is the channel from D_s and Mod_Factor adder output up to the DEQ input (which includes THP feedback portion, but doesn't include modulo nonlinear operation) will be called "linear effective data channel."

Figure 7:
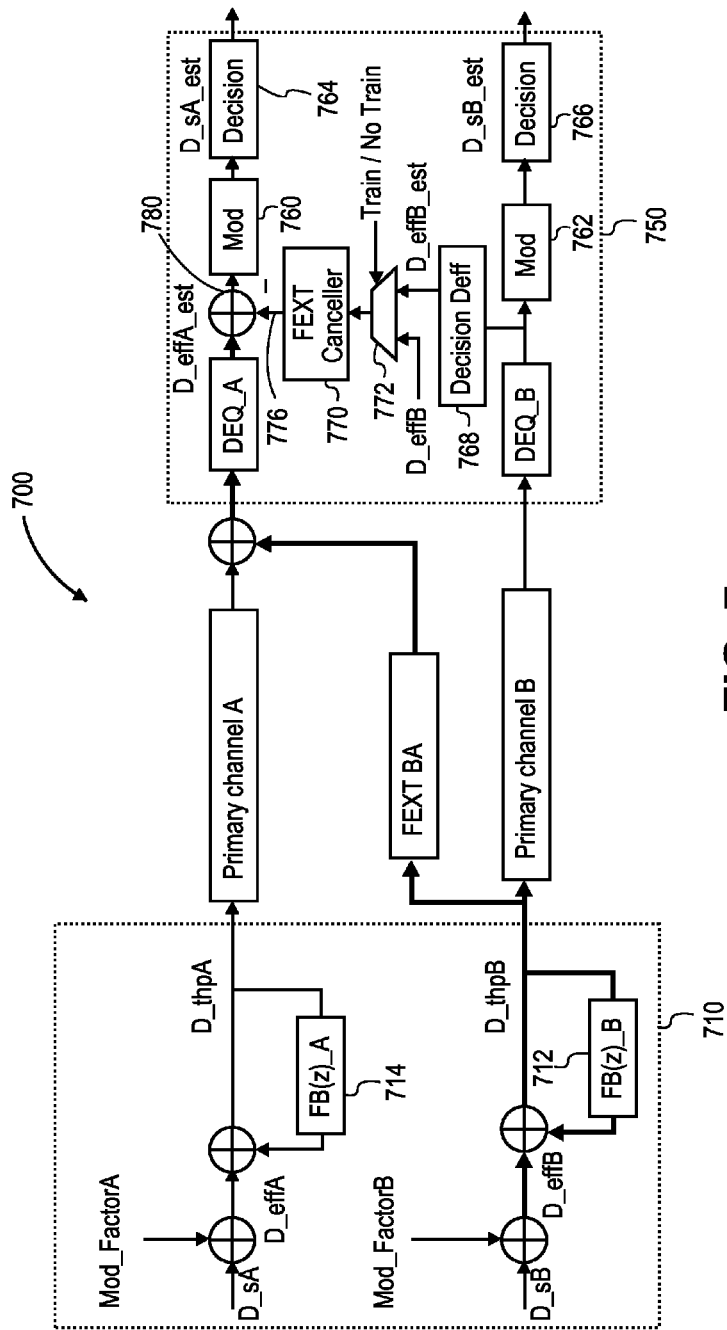
FIG. 7 illustrates an equivalent representation of a THP communication system with a FEXT BA path and a FEXT canceller based on effective data in accordance with one embodiment.

FIG. 7 illustrates an equivalent representation of a THP communication system with a FEXT BA path and a FEXT canceller based on effective data in accordance with one embodiment. The THP communication system 700 includes a transmitter unit 710 with transmitters A and B and a receiver unit 750 with receivers A and B. The transmitter unit 710 includes data source signals (e.g., D_sA, D_sB), effective linear data source signals (e.g., D_effA, DeffB), modulo factors (e.g., Mod_FactorA, Mod_FactorB), and feedback units (e.g., FB(z)_A, FB(z)_B).

The receiver unit 750 includes digital equalizers (e.g., DEQ_A, DEQ_B), known and estimated effective linear data source signals (e.g.,DeffB, DeffB_est,), modulo units (e.g., 760, 762), decision units (e.g., 764, 766, Deff 768), a multiplexer 772, a FEXT canceller 770, and output signals (e.g., D_sA est, D_sB_est). Note that the digital equalizers (e.g., DEQ_A, DEQ_B), will equalize the linear channels (e.g., linear effective data channel with inputs as D_effA, D_effB) and will produce the estimation of D_effA and D_effB data at its output.

Primary channels A and B couple the transmitter unit 710 to the receiver unit 750. A FEXT BA channel represents the FEXT signal that couples to the receiver unit 750 based on the transmission of signals across primary channel B.

A FEXT BA channel and its input are identified as a channel starting from D_effB and ending at DEQ_A output with the reference input D_effB. Note that with this arrangement, neither FEXT BA channel nor reference input contain modulo or other non-linear operation and FEXT cancellation can be implemented as shown in FIG. 7 using the Decision Deff 768, multiplexer 772, and FEXT canceller 770.

In some embodiments, the transmitter unit 710 operates in a non-linear mode (e.g., THP). The transmitter unit 710 generates and transmits signals across primary channel A and primary channel B. The receiver unit 750 is coupled to the transmitter unit 710 and receives the signals from the transmitter. The receiver unit 750 also receives one or more cross-talk signals (e.g., FEXT BA). The receiver unit 750 may also receive a FEXT AB signal that couples to primary channel B.

The transmitter unit 710 generates effective linear data source signals D_effA and D_effB. The digital equalizer (e.g., DEQ_A, DEQ_B) located in the receiver unit 750 generates estimated effective linear signals (e.g., D_effA_est, D_effB_est) which are the estimates of first and second effective linear data source signals (D_effA, D_effB), respectively. These estimates contain far end cross-talk. The receiver cancels the one or more cross-talk signals using the estimated second effective linear data source signal in a data mode or using the known second effective linear data source signal in a data training mode of the FEXT canceller 770.

In one embodiment, the transmitter unit 710 precodes a first and a second data source signal with Tomlinson-Harashima Precoding (THP). The transmitter unit 710 further includes the modulo unit 510 as illustrated in FIG. 5 to generate the THP signals based on the first data source signal, D_sA, and a second data source signal, D_sB, respectively. The transmitter unit 710 also includes the feedback units 712 and 714 to generate a first feedback signal and a second feedback signal, which are added to the first and second data source signals.

The receiver unit 750 includes a canceller unit 770, FEXT canceller, to generate a cancellation signal 772 that is based either on the second effective data source signal (training data mode) or on the estimated second effective data source signal (normal data mode). A subtractor unit 780 cancels the one or more cross-talk signals by subtracting the cancellation signal 772 from the estimated first effective data source signal in the receiver. Non-linear modulo operation implemented in the blocks Mod 760 and 762 for PAM M signaling is defined by:

Mod_out=mod(Mod_in+M, 2M)−M, where mod function implements modulo 2M operation on the argument Mod_in+M, and where Mod_in, Mod_out are the blocks input and output.

For PAM M signaling generation of estimated effective data, Deff_est, implemented in the block decision Deff 768 in FIG. 7 is the rounding of the block's input value to the nearest odd integer value. This input value taken at digital equalizer output (e.g., DEQ_B) will be properly scaled by DEQ_B.

Figure 8:
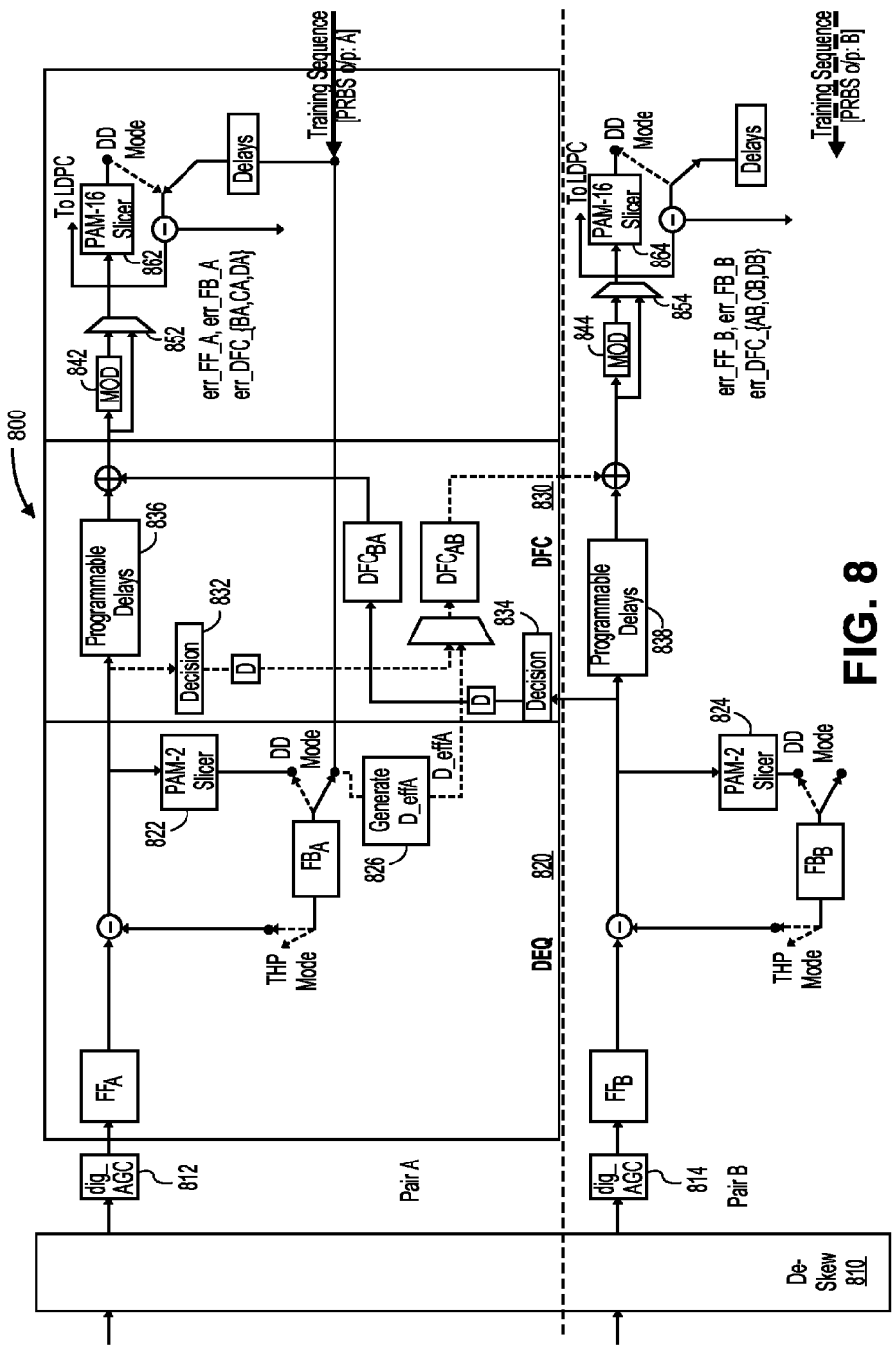
FIG. 8 illustrates a THP communication system with a FEXT canceller in accordance with one embodiment.

FIG. 8 illustrates a THP communication system with a FEXT canceller in accordance with one embodiment. FIG. 8 shows the FEXT canceller implementation in more detail. Note that in the case of training, given that the far end transmit data is available at the local end receiver, the effective training data, D_effA, can be used to train FEXT canceller (DFC 830). Block 826 generates D_effA in accordance with FIG. 5. Otherwise, if the far end transmit data is not available at the local end receiver, then the estimated data, D_effA_est, should be used at canceller reference input.

Programmable delays (e.g., 836, 838) are introduced after digital equalizer (e.g., DEQ 820) to compensate for late arrival of reference input compared to FEXT signal. Error in decision devices 862 and 864, the 'slicers', represent the difference between actual (input) and detected value. It should be emphasized here that data detected by the decision devices 832 and 834 are extended PAM data, that is they represent PAM M signaling plus multiple of 2*M as discussed above in the description of effective data presented in FIG. 5. Note that in FIG. 8 the same error is used for canceller and equalizer adaptation. This arrangement is effective since one goal of the communication system presented in this disclosure is to reduce an error in decision devices.

However, in another embodiment, other arrangements of error signal for DFC 830 and DEQ 820 is also possible with a slight degradation in the performance. For example, DEQ 820 can have its own decision device and use error from this decision device. Also DFC 830 can use as an error a signal derived after application of DFC output before going into decision device. Another alternative is to bypass the block Decision Deff 832 and/or 834. This will create only minor degradation in performance for low level PAM signaling and has shown no degradation for high level PAM signaling.

Yet another alternative is to use DEQ input as a reference input for the canceller. This will require more taps in the FEXT canceller since now canceller taps will mimic convolution of DEQ 820 and FEXT BA or AB channel. Based on error signal and reference input signal any known adaptive algorithm can be used to adapt canceller filter coefficients.

It should be also emphasized that for simplicity only cancellation of cross-talk from channel B to channel A is demonstrated in portions of this description. A similar technique is applicable to cancel cross-talk from A to B or from any channel to any channel in multi-channel environment as illustrated in FIG. 8.

FIG. 8 illustrates an implementation architecture 800 that includes the placement of delays, digital equalizer 820, FEXT canceller 830, and a deskew unit 810. This architecture 800 simplifies the slicer (e.g., 822, 824) for a feedback portion of the digital equalizer to a 2 level slicer only. The feedback portion has a very strict timing closure requirement in digital implementation, and cannot be met easily with a multi level slicer, which is necessary for any modulation higher than PAM-2. This architecture 800 simplifies the timing problem by separating the decision slicer required for the feedback portion from the error slicers (e.g., 862, 864). The deskew unit 810 corrects a deskew between channels before reaching the DEQ 820. This simplifies the adaptation algorithm (such as LMS) for the DEQ 820, as there is no need for dynamically adjusting the delays in equalizers of various channels.

In some embodiments, a canceller architecture 800 includes a digital equalizer 820 that receives first and second effective linear data source signals from a transmitter unit and also a first cross-talk signal based on the second effective linear data source signal. The digital equalizer 820 generates an estimated first and second effective data source signals based on the first and second effective linear data source signals, respectively.

The canceller architecture 800 also includes a canceller unit 830 that generates a cancellation signal to cancel the first cross-talk signal using the estimated second effective data source signal.

In one embodiment, the digital equalizer 820 receives a second cross-talk signal based on the first effective linear data source signal. In this embodiment, the canceller unit 830 cancels the second cross-talk signal using the estimated first effective data source signal.

Figure 9:
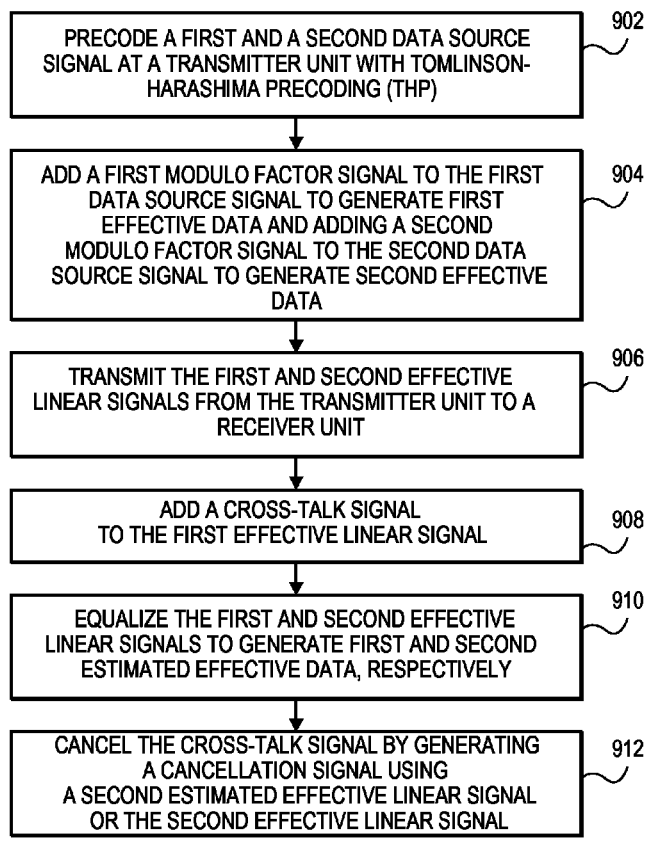
FIG. 9 illustrates a flowchart which represents a process for canceling far end cross-talk in a communication system in accordance with one embodiment.

FIG. 9 illustrates a flowchart which represents a process for canceling far end cross-talk in a communication system in accordance with one embodiment. The process includes precoding a first and a second data source signal at a transmitter unit with Tomlinson-Harashima Precoding (THP) at processing block 902. Next, the process includes adding a first modulo factor signal to the first data source signal to generate the first effective data and adding a second modulo factor signal to the second data source signal to generate the second effective data at processing block 904. Next, the process includes transmitting first and second effective linear signals having the first and second effective data, respectively, from the transmitter unit to a receiver unit at processing block 906. Next, the process includes adding a cross-talk signal based on the second linear effective signal that is transmitted from the transmitter unit to the receiver unit to the first effective linear signal at processing block 908. Next, the process includes equalizing the first and second effective linear signals to generate estimated first and second effective data, respectively, at processing block 910. Next, the process includes canceling the cross-talk signal based on using an estimated second effective linear signal having the estimated second effective data or the second effective linear signal to generate a cancellation signal at processing block 912. Canceling the cross-talk signal occurs by subtracting the cancellation signal from the estimated first effective linear signal.

Thus, a method for canceling far end cross-talk in a communication system has been described. The method and communication system work for both THP mode operations and non-THP mode operations in terms of canceling the far end cross-talk.

Although present embodiments have been described with reference to specific embodiments, it will be evident that various modifications and changes may be made to these embodiments without departing from the broader spirit and scope of the present embodiments. Accordingly, the specification and drawings are to be regarded in an illustrative rather than a restrictive sense.

What is claimed is:

1. A system, comprising:
   a receiver unit configured to receive a precoded pulse amplitude modulated (PAM) M signal and a second signal across a first channel and a second channel, respectively, the precoded PAM M signal including a cross-talk signal;
   a far end cross talk (FEXT) canceller, including a subtracter unit, located in the receiver unit to receive the preceded PAM M signal and the second signal, the FEXT canceller configured to cancel the cross-talk signal using the second signal; and
   a modulo unit configured to implement a modulo 2M operation on an output of the FEXT canceller to thereby decode the received preceded PAM M signal,
   wherein the FEXT canceller receives the second signal prior to the receiver unit performing a modulo function on the second signal.

2. The system of claim 1, wherein the precoded PAM M signal is encoded with Tomlinson-Harashima precoding (THP).

3. The system of claim 1, further comprising a second modulo unit configured to receive the second signal and configured to perform the modulo function on the second signal following receipt of the second signal by the FEXT canceller.

4. The system of claim 1, wherein the FEXT canceller comprises:
   a canceller unit configured to generate a cancellation signal that is based on the second signal in a data mode.

5. The system of claim 1, wherein the FEXT canceller comprises:
   a canceller unit configured to generate a cancellation signal that is based on the second signal in a data training mode.

6. The system of claim 1, wherein the receiver unit outputs estimates of a decoded PAM M signal and a decoded second signal.

7. The system of claim 1, wherein the subtracter unit is configured to cancel the cross-talk signal by subtracting the cancellation signal from the precoded PAM M signal in the receiver unit.

8. A method of canceling far end cross-talk in a communication system, comprising:
   equalizing first and second signals, received at a receiver unit from a transmitting unit, to generate a precoded pulse amplitude modulated (PAM) M equalized signal and a second equalized signal respectively;

canceling a cross-talk signal in the precoded PAM M equalized signal using the second equalized signal, wherein the using the second equalized signal occurs prior to a further operation on the second equalized signal; and performing a modulo 2M operation on the precoded PAM M equalized signal after the canceling.

9. The method of claim 8, wherein the precoded PAM M equalized signal and the second equalized signal were precoded with Tomlinson-Harashima precoding (THP).

10. The method of claim 8, further comprising: performing a second modulo operation on the second equalized signal after the canceling.

11. The method of claim 8, wherein the canceling the cross-talk signal by further comprises subtracting a cancellation signal based on the second equalized signal in a data mode from the precoded PAM M equalized signal.

12. The method of claim 8, wherein the canceling the cross-talk signal further comprises subtracting a cancellation signal based on the second equalized signal in a data training mode from the precoded PAM M equalized signal.

13. The method of claim 12, wherein the first signal is received, from a first channel, and the second signal is received from a second, different, channel.

14. A canceller architecture, comprising:
a digital equalizer configured to receive first and second data source signals from a transmitter unit and also a first cross-talk signal based on the second data source signal, the digital equalizer to generate a first estimated and a second estimated data source signal based on the first and second data source signals, respectively;

a canceller unit, coupled to the digital equalizer, the canceller configured to generate a cancellation signal to cancel the first cross-talk signal using the second estimated data source signal; and a modulo unit configured to implement, a modulo 2M operation on an output signal of the canceller unit, wherein the canceller unit receives the second data source signal prior to the canceller architecture having performed a modulo function on the second estimated data source signal.

15. The canceller architecture of claim 14, wherein the digital equalizer is configured to receive a second cross-talk signal based on the first data source signal.

16. The canceller architecture of claim 15, wherein the canceller unit is configured to cancel the second cross-talk signal using the first estimated data source signal.

17. The canceller architecture of claim 14, wherein the digital equalizer further comprises a feedback portion having a 2 level uncoded pulse amplitude modulation (PAM) slicer.

18. The canceller architecture of claim 17, wherein the feedback portion is switched off in Tomlinson-Harashima precoding (THP) mode.

* * * * *